United States Patent
Kim et al.

(10) Patent No.: US 10,854,863 B2
(45) Date of Patent: *Dec. 1, 2020

(54) SEPARATOR FOR SECONDARY BATTERY, METHOD FOR MANUFACTURING THE SAME AND LITHIUM SECONDARY BATTERY CONTAINING THE SAME

(71) Applicants: SK INNOVATION CO., LTD., Seoul (KR); SK IE TECHNOLOGY CO., LTD., Seoul (KR)

(72) Inventors: Yun Bong Kim, Daejeon (KR); Su Ji Lee, Daejeon (KR); Kyu Young Cho, Daejeon (KR); Won Sub Kwack, Daejeon (KR); Hye Jin Kim, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 58 days.

This patent is subject to a terminal disclaimer.

(21) Appl. No.: 16/161,417

(22) Filed: Oct. 16, 2018

(65) Prior Publication Data

US 2019/0115577 A1    Apr. 18, 2019

(30) Foreign Application Priority Data

Oct. 17, 2017    (KR) .......................... 10-2017-0134395

(51) Int. Cl.
| | | |
|---|---|---|
| *H01M 2/16* | (2006.01) | |
| *H01M 10/0525* | (2010.01) | |
| *H01M 2/14* | (2006.01) | |
| *H01M 4/62* | (2006.01) | |
| *C08J 5/22* | (2006.01) | |

(52) U.S. Cl.
CPC ............... *H01M 2/166* (2013.01); *C08J 5/22* (2013.01); *H01M 2/145* (2013.01); *H01M 2/1646* (2013.01); *H01M 2/1653* (2013.01); *H01M 2/1673* (2013.01); *H01M 2/1686* (2013.01); *H01M 4/622* (2013.01); *H01M 10/0525* (2013.01); *H01M 2220/20* (2013.01)

(58) Field of Classification Search
CPC .. H01M 2/145; H01M 2/1646; H01M 2/1653; H01M 2/166; H01M 2/1673; H01M 2/1686; H01M 4/622; H01M 10/0525; C08J 5/22

See application file for complete search history.

(56) References Cited

U.S. PATENT DOCUMENTS

2014/0186680 A1*   7/2014   Kim .................... H01M 2/1646
                                                            429/144
2015/0140403 A1†   5/2015   Moon

FOREIGN PATENT DOCUMENTS

| KR | 10-2014-0124321 A | 10/2014 |
| KR | 10-1453785 B1 | 10/2014 |
| KR | 10-2016-0012063 A | 2/2016 |
| KR | 1020160041492 | 4/2016 |
| KR | 10-2016-0079623 A | 7/2016 |

\* cited by examiner
† cited by third party

Primary Examiner — Brittany L Raymond
(74) Attorney, Agent, or Firm — IP & T Group LLP

(57) ABSTRACT

Provided is a separator for a secondary battery including: a porous substrate; and a coating layer formed on the porous substrate, wherein the coating layer includes a plurality of inorganic particles and a binder for binding the plurality of inorganic particles, and the binder includes a copolymer of a monomer mixture including an acrylamide-based monomer, a vinyl cyanide monomer, and an acrylic monomer having a carboxyl group.

9 Claims, No Drawings

SEPARATOR FOR SECONDARY BATTERY, METHOD FOR MANUFACTURING THE SAME AND LITHIUM SECONDARY BATTERY CONTAINING THE SAME

CROSS-REFERENCE TO RELATED APPLICATIONS

This application claims priority under 35 U.S.C. § 119 to Korean Patent Application No. 10-2017-0134395, filed on Oct. 17, 2017, in the Korean Intellectual Property Office, the disclosure of which is incorporated herein by reference in its entirety.

TECHNICAL FIELD

The following disclosure relates to a separator for a secondary battery, a method for manufacturing the same, and a lithium secondary battery containing the same.

BACKGROUND

In recent years, there is a growing demand for high strength, high transmittance, thermal stability of a separator, and for improving characteristics of the separator for electrical safety of a secondary battery during charging and discharging in accordance with the trend of high capacity and high output of the secondary battery. A lithium secondary battery is required to have high mechanical strength for improvement of safety during a process of manufacturing a battery and while using the battery, and to have high transmittance and high thermal stability for improvement of capacity and power.

In addition, the lithium secondary battery is charged and discharged while repeating a process in which lithium ions in a cathode are intercalated into and deintercalated from an anode. When the charge and discharge cycles are repeated, a theoretical capacity of the battery varies depending on the type of electrode active material, but a charge and discharge capacity is generally reduced as the cycle progresses.

Currently, a mass-produced polymer separator has been studied to simultaneously improve thermal resistance and battery stability by mixing an inorganic material such as alumina, or the like, in the form of a binder solution so as to improve thermal shrinkage, followed by coating using a wet method such as die coating, dip coating, or the like, and drying.

Conventionally, a step of forming a coating layer using a thermal resistant resin using an organic solvent has been applied as one aspect for improving the thermal resistance of the separator for a secondary battery. When the organic solvent is used, there are disadvantages in that economical efficiency is lowered and it is not environmentally friendly due to a process of recovering or burning a solvent after coating and drying the organic solvent. In addition, the organic solvent has a feature of being absorbed into pores of a microporous membrane in the applying process due to excellent affinity with the microporous membrane. Due to the feature, when a coating layer is formed of a solution in which a thermal resistant resin is dissolved, an inner portion of the pores of the microporous membrane is applied with the thermal resistant resin after the drying process. The microporous membrane applied with the thermal resistant resin has a reduced pore size, and thus transmittance is lowered. When a shutdown function of the microporous membrane is exhibited at a high temperature, the shutdown is interrupted by the thermal resistant resin applied inside the pores. When the organic solvent is used to improve the thermal resistance, environmental problems occur and basic functions of the microporous membrane are hindered, and thus advantages that are intended to be obtained by applying a thermal resistant layer are negated.

In order to solve this problem, Korean Patent Laid-Open No. 10-2016-0041492 proposes a method for forming a coating layer on a porous polymer substrate using a polyvinylidene fluoride dispersion, an aqueous slurry containing inorganic particles and organic particles. The above document suggests a separator for an electrochemical device having excellent thermal resistance and strength by improving adhesion with the porous substrate. However, the degree of thermal and electrochemical stability of the separator is still insufficient to use the separator for securing the safety of the battery, and thus a battery capacity still needs to be improved.

There is a demand for a novel process for manufacturing a separator which is excellent in thermal and electrochemical stability and is advantageous in securing pores so as to solve these problems.

RELATED ART DOCUMENT (Patent Document 1) Korean Patent Laid-Open Publication No. KR 10-2016-0041492

SUMMARY

An embodiment of the present disclosure is directed to providing a separator for a secondary battery having improved thermal stability such as a low thermal shrinkage ratio, a high melt fracture temperature, or the like.

Another embodiment of the present disclosure is directed to providing a separator for a secondary battery in which an increase rate of resistance in a cell is low even when a content of a binder increases, such that a rapid decrease in initial lifespan and deterioration of a secondary battery may be improved, and additional stability and coating processability may be secured.

Still another embodiment of the present disclosure is directed to providing a method for manufacturing a separator for a secondary battery in which when forming a coating layer of the separator, pore closure of a porous substrate may be prevented, and lithium ions in the manufactured separator may be smoothly moved to remarkably improve electrical characteristics such as a capacity retention rate of the secondary battery, and the like.

Still another embodiment of the present disclosure is directed to providing a lithium secondary battery containing the separator for a secondary battery.

In one general aspect, a separator for a secondary battery includes: a porous substrate; and a coating layer formed on the porous substrate, wherein the coating layer includes a plurality of inorganic particles and a binder for binding the plurality of inorganic particles, and the binder includes a copolymer of a monomer mixture including an acrylamide-based monomer, a vinyl cyanide monomer, and an acrylic monomer having a carboxyl group.

The monomer mixture may further include an acrylic monomer having a hydroxyl group.

The copolymer may include 30 to 50 wt % of an acrylamide-based monomer, 20 to 40 wt % of a vinyl cyanide monomer, 5 to 20 wt % of an acrylic monomer having a carboxyl group, and 5 to 20 wt % of an acrylic monomer having a hydroxyl group, based on a total amount of the copolymer.

The coating layer may include 70 to 99.5 wt % of inorganic particles and 0.5 to 30 wt % of a binder, based on a total amount of the coating layer.

The binder may have a particle phase.

The inorganic particle and the binder particle may have an average particle diameter of 10 nm to 2 μm.

The binder may have a glass transition temperature of 150 to 200° C.

The copolymer may have a weight average molecular weight of 100,000 to 1,000,000 g/mol.

In another general aspect, a method for manufacturing a separator for a secondary battery includes: a) applying an aqueous slurry including inorganic particles, a binder, and water on a porous substrate; and b) forming a coating layer by heat drying after applying the aqueous slurry, wherein the binder includes a copolymer of a monomer mixture including an acrylamide-based monomer, a vinyl cyanide monomer, and an acrylic monomer having a carboxyl group.

The monomer mixture may further include an acrylic monomer having a hydroxyl group.

The copolymer may include 30 to 50 wt % of an acrylamide-based monomer, 20 to 40 wt % of a vinyl cyanide monomer, 5 to 20 wt % of an acrylic monomer having a carboxyl group, and 5 to 20 wt % of an acrylic monomer having a hydroxyl group, based on a total amount of the copolymer.

A drying temperature in step b) may range from 60 to 100° C.

In still another general aspect, a lithium secondary battery includes the separator for a secondary battery as described above.

DETAILED DESCRIPTION OF EMBODIMENTS

Hereinafter, the present disclosure will be described in detail. It should be understood, however, that the following examples are only illustrative of the present disclosure in detail, and the present disclosure is not limited thereto, and may be implemented in various forms.

In addition, unless defined otherwise, all technical and scientific terms used herein have the same meanings as commonly understood by one of those skilled in the art to which the present disclosure pertains. Terms used herein have purposes of describing particular embodiments only and are not intended to limit the present disclosure.

The present disclosure relates to a separator for a secondary battery capable of preventing a rapid decrease in lifespan, and improving thermal stability and electrical characteristics.

In a general separator for a secondary battery, a coating layer for improving thermal resistance on a porous substrate has been used by mixing a non-aqueous or aqueous binder with inorganic particles. In the non-aqueous binder, since an organic solvent, polyvinylidene fluoride which is a fluorine-based polymer, and the like, are used, not only environmental pollution occurs but also adhesion between the porous substrate and the coating layer is remarkably decreased. In order to solve this problem, an aqueous binder is proposed, which has advantages of being environmentally friendly by using water and increasing a battery capacity by reducing a used content of the binder. However, the thermal stability is very low. In addition, the non-aqueous binder or the aqueous binder has problems in that an organic material dissolved in the organic solvent, a binder dissolved in water, or the like penetrates into pores of the porous substrate, such that movement of lithium ions is limited due to pore closure, which causes ignition, explosion, and the like due to overheating and overload. In particular, since the thermal stability is low, it is difficult to deal with overheating and overloading, and thus it is difficult to perform a function as a separator.

The separator for a secondary battery according to an embodiment of the present disclosure has remarkably improved thermal stability such as a low thermal shrinkage ratio, a high glass transition temperature, and a high melt fracture temperature, and the like, and thus it is possible to prevent ignition or rupture, and a rapid decrease in initial lifespan caused by abnormal phenomenon such as a rapid increase in temperature, or the like, in the lithium secondary battery.

Specifically, the separator for a secondary battery according to an embodiment of the present disclosure may be a separator including a porous substrate and a coating layer formed on the porous substrate, wherein the coating layer may include a plurality of inorganic particles and a binder for binding the plurality of inorganic particles, and the binder may include a copolymer of a monomer mixture including an acrylamide-based monomer, a vinyl cyanide monomer, and an acrylic monomer having a carboxyl group.

Even though the content of the binder increases so as to improve adhesion, the separator for a secondary battery according to an embodiment of the present disclosure may have a low increase rate of resistance in a cell to improve a rapid decrease in the initial lifespan of the secondary battery, to secure additional stability, and to ensure coating processability.

In addition, the separator for a secondary battery according to an embodiment of the present disclosure may have a low thermal shrinkage ratio, a high glass transition temperature, and a high melt fracture temperature characteristic, such that the thermal stability may be remarkably improved to prevent ignition or rupture caused by abnormal phenomenon such as a rapid increase in temperature, or the like, in the lithium secondary battery, and a short-circuit between the electrodes may be prevented, resulting in improvement of battery stability.

The separator for a secondary battery according to an embodiment of the present disclosure surprisingly has a significantly low thermal shrinkage ratio at 160° C. by including the copolymer of the monomer mixture including the acrylamide-based monomer, the vinyl cyanide monomer, and the acrylic monomer having a carboxyl group as a binder, and thus the thermal stability and an effect of improving the lifespan may be remarkably improved.

The monomer mixture may further include an acrylic monomer having a hydroxyl group. When the acrylic monomer having a hydroxyl group is further included as described above, as the thermal shrinkage ratio may be remarkably reduced, the thermal stability and the effect of improving the lifespan may be remarkably improved.

The copolymer may include 30 to 50 wt % of the acrylamide-based monomer, 20 to 40 wt % of the vinyl cyanide monomer, 5 to 20 wt % of the acrylic monomer having a carboxyl group, and 5 to 20 wt % of the acrylic monomer having a hydroxyl group. More specifically, the copolymer may include 40 to 50 wt % of the acrylamide-based monomer, 30 to 40 wt % of the vinyl cyanide monomer, 5 to 15 wt % of the acrylic monomer having a carboxyl group, and 5 to 15 wt % of the acrylic monomer having a hydroxyl group. The separator for a secondary batter may have a low thermal shrinkage ratio at 160° C. by including the copolymer of the monomer mixture within the above-described range in the coating layer, and thus the thermal stability and the effect of improving the lifespan may be remarkably improved.

Specific examples of the acrylamide-based monomer may include any one or a mixture of two or more selected from the group consisting of acrylamide, n-methylol acrylamide, n-butoxymethylacrylamide, methacrylamide, and the like. When the acrylamide-based monomer is prepared with a copolymer with the vinyl cyanide monomer and the acrylic monomer having a carboxyl group, excellent wettability with respect to an electrolyte of the secondary battery may be provided, and the binder itself may have porosity, and thus even in the binder, the electrolyte may be maintained well to improve stability of the separator with excellent ionic conductivity. More specifically, when the acrylamide-based monomer is prepared with a copolymer with the vinyl cyanide monomer, the acrylic monomer having a carboxyl group, and the acrylic monomer having a hydroxyl group, the above-described physical properties may be further improved.

Specific examples of the vinyl cyanide monomer may include acrylonitrile, methacrylonitrile, ethacrylonitrile, or a mixture thereof. When the vinyl cyanide monomer is prepared with a copolymer with the acrylamide-based monomer and the acrylic monomer having a carboxyl group, adhesion and close adhesion with the porous substrate and the inorganic particles may be improved, and mechanical properties such as rigidity, bending strength, and the like, of the separator may be improved. More specifically, when the vinyl cyanide monomer is prepared with a copolymer with the acrylamide-based monomer, the acrylic monomer having a carboxyl group, and the acrylic monomer having a hydroxyl group, the above-described physical properties may be further improved.

Specific examples of the acrylic monomer having a carboxyl group may include acrylic acid, methacrylic acid, or a mixture thereof. When the acrylic monomer having a carboxyl group is prepared with a copolymer with the acrylamide-based monomer and the vinyl cyanide monomer, the thermal shrinkage ratio of the separator at a high temperature is remarkably reduced to implement excellent thermal stability and a low increase rate of discharge resistance, resulting in preventing a rapid decrease in the initial lifespan. More specifically, when the acrylic monomer having a carboxyl group is prepared with a copolymer with the acrylamide-based monomer, the vinyl cyanide monomer, and the acrylic monomer having a hydroxyl group, the above-mentioned physical properties may be further improved.

Specific examples of the acrylic monomer having a hydroxyl group may include any one or a mixture of two or more selected from the group consisting of 2-hydroxyacrylate, 4-hydroxybutyl acrylate, 2-hydroxyethyl acrylate, 2-hydroxypropyl acrylate, 2-acryloxyethyl-2-hydroxypropyl phthalate, and 2-hydroxy-3-phenoxypropyl acrylate, and the like. When the acrylic monomer having a hydroxyl group is prepared with a copolymer with the acrylamide-based monomer, the vinyl cyanide monomer, and the acrylic monomer having a carboxyl group, the thermal shrinkage ratio of the separator is remarkably reduced even at a high temperature to implement excellent thermal stability and a low increase rate of discharge resistance, resulting in preventing a rapid decrease in the initial lifespan.

Since the binder includes a copolymer of a monomer mixture including the acrylamide-based monomer, the vinyl cyanide monomer, and the acrylic monomer having a carboxyl group, significant improvement of thermal stability such as a melt fracture temperature, or the like, is noticeable in the present disclosure, and even though the content of the binder increases, the increase rate of discharge resistance is low, and thus it is possible to prevent a rapid decrease in the initial lifespan and deterioration. More specifically, when the monomer mixture further includes the acrylic monomer having a hydroxyl group, the above-described physical properties may be further improved. The reason for this is not clear, but it is considered that this phenomenon is shown since a bridge that induces a firmer bond between particles is formed by chemical bonding, secondary bonding, or the like, between the binders or between the binder and the inorganic particles resulted from a thermal reaction or other reactions of a reactive group such as the carboxyl group, the hydroxyl group, or the like, of the monomer.

In the separator for a secondary battery according to an embodiment of the present disclosure, the binder may have an amount of 0.5 wt % or more to 30 wt % or less, more specifically 1 wt % or more to 30 wt % or less, 2 wt % or more to 30 wt % or less, 2 wt % or more to 20 wt % or less, 2 wt % or more to 15 wt % or less, or 5 wt % or more to 15 wt % or less, based on a total of 100 wt % of the coating layer, but the amount of binder is not limited thereto.

The binder may have a particle phase. When the binder having a particle phase is provided as described above, pore closure of the porous substrate may be prevented, such that lithium ions may move smoothly, whereby electrical characteristics such as a capacity retention rate, and the like, of the secondary battery may be remarkably improved.

The binder may be provided in a particle phase in an aqueous slurry, and may have an average particle diameter of 10 nm to 2 μm, more specifically 50 to 800 nm. When the binder has the average particle diameter, the binder may be uniformly dispersed in the aqueous slurry, pores of the coating layer may be easily formed when the coating layer is formed, and pore closure of the porous substrate may be prevented, and thus it is possible to prevent rapid movement of lithium ions and overload.

The binder may have a glass transition temperature of 150 to 200° C., more specifically 170 to 200° C., but is not limited thereto. When the glass transition temperature is satisfied, thermal stability is excellent at a high temperature of 160° C. or more, such that a thermal shrinkage ratio may be low, and even if meltdown of the porous separator occurs, the coating layer may be maintained on the porous substrate, and thus a short-circuit between electrodes may be prevented to have excellent battery stability.

In the separator for a secondary battery according to an embodiment of the present disclosure, the copolymer may have a weight average molecular weight of 100,000 to 1,000,000 g/mol, and more specifically, a weight average molecular weight of 100,000 to 500,000 g/mol, but is not limited thereto. When the weight average molecular weight is satisfied, it is possible to have a uniform dispersibility in an aqueous slurry, such that it is easy to control viscosity, and after the coating layer is formed, the melt fracture temperature, or the like, may be improved to increase the thermal stability.

As described above, even though the content of the binder increases so as to improve adhesion, the separator for a secondary battery according to an embodiment of the present disclosure may have a low increase rate of resistance in a cell to improve a rapid decrease in the initial lifespan of the secondary battery, to secure additional stability, and to ensure coating processability.

The separator for a secondary battery of the present disclosure may include the coating layer combined by including inorganic particles and the above-described binder on the porous substrate, such that the thermal shrinkage ratio at a high temperature may be reduced, and the melt fracture temperature may be significantly improved to improve the thermal stability. Further, the pore closure of the porous substrate, or the like, may be prevented, such that lithium ions may move smoothly, whereby a capacity retention rate of the lithium secondary battery may be further improved.

In addition, the binder of the separator for a secondary battery including the coating layer may be provided in a particle phase, such that limitation of the movement of lithium ions due to the pore closure may be prevented, and the pores may be stably maintained when the pressure is applied.

In the separator for a secondary battery according to an embodiment of the present disclosure, the coating layer may be formed of a bond between inorganic particles and a binder particle, and a bond between the porous substrate and a binder particle.

In the separator for a secondary battery according to an embodiment of the present disclosure, the inorganic particle may be any one or two or more inorganic particles selected from the group consisting of alumina, boehmite, aluminum hydroxide, titanium oxide, barium titanium oxide, magnesium oxide, magnesium hydroxide, silica, clay, glass powder, and the like, but is not limited thereto.

The inorganic particle may have an amount of 70 wt % or more to 99.5 wt % or less, more specifically 70 wt % or more to 99 wt % or less, 70 wt % or more to 98 wt % or less, 80 wt % or more to 98 wt % or less, 85 wt % or more to 98 wt % or less, or 85 wt % or more to 95 wt % or less, based on a total of 100 wt % of the coating layer, but the amount of inorganic particle is not limited thereto.

When the coating layer includes the binder and the inorganic particles in the above-described content, the pores of the coating layer may be ensured, and adhesion between the porous substrate and the coating layer or between the inorganic particles may be ensured. Even if the binder is included in a high content, the increase rate of resistance in a cell is low, and thus it is possible to prevent a rapid decrease in the initial lifespan of the secondary battery, to secure additional stability, and to ensure coating processability.

The binder may be provided in a particle phase, and the inorganic particle and the binder particle may have an average particle diameter of 10 nm to 2 µm, and more specifically, 50 to 800 nm. The average particle diameters of the inorganic particle and the binder particle may be the same as or different from each other. However, it is preferable that the average particle diameters of the inorganic particle and the binder particle may be different for the thermal stability and electrical characteristics of the separator.

For the thermal stability and electrical characteristics of the separator for a secondary battery, it is preferable that the average particle diameters of the inorganic particle and the binder particle are different from each other. As a specific example, the inorganic particle and the binder particle may have an average particle diameter ratio satisfying Equation 1 below:

$$0.1 \leq \frac{R_a}{R_i} \leq 0.6 \quad \text{[Equation 1]}$$

in Equation 1, $R_a$ is an average particle diameter of the binder particle, and $R_i$ is an average particle diameter of the inorganic particle.

When the inorganic particle and the binder particle are included at the average particle diameter ratio, the thermal stability of the separator may be further improved. Further, it is possible to ensure pores generated between the inorganic particles or between the inorganic particle and the porous substrate by partial adhesion or bonding of the inorganic particle by the binder particle.

The porous substrate is usable without limitation if it is a microporous membrane adopted in the art such as a polyolefin resin, or the like. Further, the porous substrate is not particularly limited if it is a non-woven fabric, paper, and a porous film that is applicable to a battery with pores by including inorganic particles in inner pores or on a surface of the microporous membrane thereof.

The polyolefin-based resin is preferably a polyolefin-based resin alone or a mixture thereof. Specific examples of the polyolefin-based resin may be any one or a mixture of two or more selected from the group consisting of polyethylene, polypropylene, and a copolymer thereof. In addition, the porous substrate may be formed by including the polyolefin resin alone or by further including an inorganic particle or an organic particle while including the polyolefin resin as a main component. In addition, the porous substrate may be used in a stacked form. For example, the polyolefin-based resin may be composed of a plurality of layers, and it is not excluded that any one layer or all layers of the substrate layer composed of multilayers include the inorganic particle and the organic particles in the polyolefin resin.

A thickness of the porous substrate is not particularly limited, but may be 5 to 30 µm. The porous substrate may be a porous substrate mainly formed by stretching, but is not limited thereto.

The separator for a secondary battery according to an embodiment of the present disclosure may have a thermal shrinkage ratio of 3% or less at 160° C., more specifically, a very low thermal shrinkage ratio of 1.5% or less at 160° C., and thus it is possible to prevent ignition or rupture caused by an abnormal phenomenon such as a rapid increase in temperature, or the like, in the lithium secondary battery.

The separator for a secondary battery may have a melt fracture temperature of 180° C. or higher. More specifically, the melt fracture temperature may be 200° C. or higher. The separator for a secondary battery manufactured according to the present disclosure may have the above-described physical properties to have remarkably low thermal shrinkage ratio at a high temperature, and thus the thermal stability may be remarkably improved. Further, even though the content of the binder is high, the increase rate of discharge resistance may be low, such that the effect of improving the lifespan may be obtained.

A method for manufacturing a separator for a secondary battery according to an embodiment of the present disclosure may include: a) applying an aqueous slurry including inorganic particles, a binder, and water on a porous substrate; and b) forming a coating layer by heat drying after applying the aqueous slurry, wherein the binder may include a copolymer of a monomer mixture including an acrylamide-based monomer, a vinyl cyanide monomer, and an acrylic monomer having a carboxyl group.

The monomer mixture may further include an acrylic monomer having a hydroxyl group to improve physical properties.

Through the above-described manufacturing method, it is possible to manufacture a separator for a lithium secondary battery in which the thermal stability is significantly improved, and the capacity characteristics such as a capacity retention rate of the battery, and the like, are significantly improved. This description may be supported by Examples to be described below.

The present disclosure is described in detail.

The applying of the aqueous slurry including inorganic particles, a binder, and water on the porous substrate is a step of applying an aqueous slurry for forming a coating layer having excellent thermal stability and electrical characteristics on the porous substrate. The types of the porous substrate, the inorganic particles, and the binder are the same as described above, and thus, detailed descriptions thereof are omitted.

The water may include any one or a mixture of two or more selected from the group consisting of water such as distilled water, purified water, and the like.

In addition, as described above, the binder in the aqueous slurry may be provided in particle phase.

The aqueous slurry may include the inorganic particle and the binder particle, and the aqueous slurry may be in a form dispersed the inorganic particle and the binder particle in water. Specifically, the binder particle may be provided in the form of particles dispersed in water through emulsion or suspension polymerization. The aqueous slurry may be prepared by adding and dispersing the inorganic particles in water in which the binder particles are dispersed.

The separator for a secondary battery according to an embodiment of the present disclosure surprisingly has a significantly low thermal shrinkage ratio at 160° C. by including the copolymer of the monomer mixture including the acrylamide-based monomer, the vinyl cyanide monomer, and the acrylic monomer having a carboxyl group through emulsion or suspension polymerization to form the coating layer, and thus the thermal stability and an effect of improving the lifespan may be remarkably improved. In addition, the separator for a secondary battery may prevent limitation of the movement of lithium ions due to the pore closure, and may maintain the pores stably when the pressure is applied. More specifically, when the monomer mixture further includes the acrylic monomer having a hydroxyl group, the above-described physical properties may be further improved.

The copolymer may include 30 to 50 wt % of an acrylamide-based monomer, 20 to 40 wt % of a vinyl cyanide monomer, 5 to 20 wt % of an acrylic monomer having a carboxyl group, and 5 to 20 wt % of an acrylic monomer having a hydroxyl group, based on a total amount of the copolymer. More specifically, the copolymer may include 40 to 50 wt % of an acrylamide-based monomer, 30 to 40 wt % of a vinyl cyanide monomer, 5 to 15 wt % of an acrylic monomer having a carboxyl group, and 5 to 15 wt % of an acrylic monomer having a hydroxyl group. The separator may have a remarkably low thermal shrinkage at 160° C. by including the copolymer of the monomer mixture within the above-described range to form the coating layer, and thus it is possible to form the coating layer having remarkably improved thermal stability and effect of improving the lifespan.

A drying temperature in step b) may range from 60 to 100° C. By performing the drying, the coating layer may be uniformly dried without affecting the physical properties of the porous substrate, thereby preventing coating defects. The drying step is a step of drying water of the aqueous slurry applied on the porous substrate and inducing bonding of the inorganic particles and the binder to finally form the coating layer.

One aspect of the present disclosure provides a lithium secondary battery including the separator for a secondary battery as described above. The lithium secondary battery may be manufactured by including the separator for a secondary battery according to an embodiment of the present disclosure, a cathode, an anode, and a non-aqueous electrolyte.

The separator for a secondary battery is the same as described above, and thus detailed descriptions thereof are omitted.

The cathode and the anode may be manufactured by mixing and stirring a solvent, if necessary, a binder, a conductive material, a dispersing material, and the like, in a cathode active material and an anode active material to prepare a mixed material, and applying the mixed material to a current collector of a metal material, followed by drying and pressing.

The cathode active material may be used as long as it is an active material conventionally used for a cathode of a secondary battery. For example, lithium metal oxide particles including one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof may be used.

The anode active material may be used as long as it is an active material conventionally used for an anode of a secondary battery. The anode active material of the lithium secondary battery is preferably a material capable of intercalating lithium. Non-limiting examples of the anode active material may include one or two or more materials selected from the group consisting of anode active material groups such as lithium (metal lithium), graphitizable carbon, non-graphitizable carbon, graphite, silicon, Sn alloy, Si alloy, Sn oxide, Si oxide, Ti oxide, Ni oxide, Fe Oxide (FeO) and lithium-titanium oxide ($LiTiO_2$, $Li_4Ti_5O_{12}$).

As the conductive material, a conventional conductive carbon material may be used without any particular limitation.

The current collector of the metal material, which is a metal in which conductivity is high and the mixed material of the cathode active material or the anode active material is easily adhered thereto, may be any material as long as it does not have reactivity in a voltage range of the battery. Non-limiting examples of the cathode current collector may include foil made of aluminum, nickel or a combination thereof. Non-limiting examples of the anode current collector may include foil made of copper, gold, nickel, or a copper alloy or a combination thereof.

A separator is interposed between the cathode and the anode. As a method of applying the separator to a battery, lamination, stacking, and folding, and the like, of the separator and the electrodes may be performed in addition to a general method, winding.

The non-aqueous electrolyte includes a lithium salt as an electrolyte and an organic solvent, wherein the lithium salt may be, without limitation, any material conventionally used in an electrolyte for a lithium secondary battery, and may be represented by $Li^+X^-$.

An anion of the lithium salt is not particularly limited, and may be any one or two or more among $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2$ $CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent may be any one or a mixture of two or more selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, sulfolane, gamma butyrolactone, tetrahydrofuran, and the like.

The non-aqueous electrolyte may be injected into an electrode structure composed of a cathode, an anode, and a separator interposed between the cathode and the anode.

An external shape of the lithium secondary battery is not particularly limited, but may be selected from a cylindrical shape using a can, a square shape, a pouch shape, a coin shape, or the like.

While the present disclosure has been specifically described with reference to embodiments of the present disclosure as described above, it will be apparent to those skilled in the art that various modifications and variations can be made in the present disclosure without departing from the spirit or scope of the disclosure as defined in the appended claims. Thus, modifications of the embodiments of the present disclosure will not depart from the scope of the present disclosure.

[Method for Measuring Physical Properties]

1. Measurement of Thermal Shrinkage Ratio

The thermal shrinkage ratio of the separator at 160° C. was measured by cutting a separator into a square shape with a side length of 10 cm to prepare a specimen, and measuring and recording the specimen before measurement using a camera. Each five sheets of A4 paper were placed on the top and bottom of the specimen so that the specimen is in the center, and then four sides of the paper were fixed with a clip. The specimen wrapped in paper was left in a 160° C. hot air drying oven for 1 hour. After leaving the specimen, the specimen was taken out and measured with a camera to calculate a machine direction shrinkage (MD, length direction) of Mathematical Equation 1 below and a transverse direction shrinkage (TD) of Mathematical Equation 2 below:

Machine direction (MD) shrinkage (%)=(Length in MD before heating−length in MD after heating)×100/length in MD before heating     [Mathematical Equation 1]

Transverse direction (TD) shrinkage (%)=(Length in TD before heating−length in TD after heating)×100/length in TD before heating     [Mathematical Equation 2]

2. TMA and Melt Fracture Temperature

A 0.015 N weight was placed on a 6 mm×10 mm separator specimen using a thermo-mechanical analysis (TMA) instrument manufactured by METTLER TOLEDO, and a temperature was raised at a rate of 5° C./rain.

TMA melt fracture temperature is defined as a temperature at which fracture of the specimen occurs, and a temperature at which the x-axis meets the maximum slope in the case of a sample in which the melt fracture did not occur.

3. Measurement of Tensile Strength

The tensile strength of the separator was measured according to ASTM D882, wherein the tensile strength of the separator was measured in the machine direction (MD) and the transverse direction (TD), respectively, and a lower value of the tensile strength in MD and TD was defined as the tensile strength of the membrane. Each specimen was cut into a rectangular shape having a width of 15 mm and a height of 120 mm and pulled at a speed of 500 mm/min through a stretching machine. The strength (kgf) when the specimen was broken was divided by the width of the specimen (15 mm) was recorded and compared with each other.

4. Measurement of Discharge Resistance

The increase in discharge resistance was confirmed by dividing a change in electric potential, which was obtained by discharging the battery for 10 seconds at 80 A in the SOC50 state of the battery, and charging the battery for 10 seconds, by an electric current.

5. Measurement of Battery Lifespan

Each battery manufactured through the above assembling process was charged and discharged 500 times at a discharge speed of 1 C, then a discharge capacity thereof was measured, and a cycle evaluation was performed to measure the degree of decrease relative to the initial capacity.

6. Measurement of Battery Thickness

In order to confirm whether delamination phenomenon between an electrode plate and the separator occurred and deformation of the battery occurred when the battery was charged and discharged, a thickness of the battery was measured using a Thickness Gauge manufactured by Mitsutoyo after 500 cycles of charging and discharging, and compared with a thickness before the charge and discharge to measure a battery thickness increase rate of Mathematical Equation 3 below.

Battery thickness increase rate (%)=(B−A)/A×100     [Mathematical Equation 3]

A: Battery thickness before charge and discharge (mm)
B: Battery thickness after charge and discharge (mm)

7. Battery Penetration Evaluation

In order to measure the safety of the battery, each manufactured battery was fully charged with SOC (State of Charge) of 100%, and then nail penetration evaluation was performed. Here, a diameter of the nail was 3.0 mm, and a penetration speed of the nail was all fixed to 80 ram/min. L1: no change, L2: slight heat generation, L3: leakage, L4: fuming, L5: ignition, L1 to L3 were determined as Pass, and L4 to L5 were determined as Fail.

8. Measurement of Capacity Retention Rate

With respect to the lithium secondary batteries manufactured, when the discharge capacity at 0.5 C was regarded as 100%, the capacity retention rate according to C-crate was measured.

Examples 1 to 11 and Comparative Examples 1 to 7: Manufacture of Separator

Example 1

100 parts by weight of ionized water, 0.60 part by weight of n-dodecyl mercaptan as an emulsifier, and a monomer mixture including 35 parts by weight of acrylamide, 21 parts by weight of acrylonitrile, 7 parts by weight of acrylic acid, and 7 parts by weight of 2-hydroxyethyl acrylate were mixed to prepare a monomer solution.

A reactor of a four-necked flask equipped with a stirrer, a thermometer, a nitrogen inlet, and a circulating condenser was prepared. When an internal temperature of the reactor reached 35° C., the monomer solution, 0.001 part by weight of benzoyl peroxide as a polymerization initiator, 0.020 part by weight of sodium formaldehyde sulfoxylate (SFS) were added dropwise for 3 hours to proceed the reaction. Thereafter, 0.0001 part by weight of benzoyl peroxide and 0.002 part by weight of sodium formaldehyde sulfoxylate (SFS) were further added to remove the remaining monomer, and the resulting mixture was reacted for 2 hours to prepare binder particles. The prepared binder particle had an average particle diameter of 110 nm in the form of latex.

10 parts by weight of the binder particles were added and dispersed in 100 parts by weight of water, and 90 parts by weight of boehmite (γ-AlO(OH)) (Apyral AOH60 manufactured by Nabaltec) having an average particle diameter of 500 nm was added thereto and stirred to prepare a uniform aqueous slurry.

A polyolefin microporous membrane product (ENPASS manufactured by SK Innovation) having a thickness of 9 μm was used as the porous substrate, and the aqueous slurry was coated on both sides of the substrate at a speed of 10 m/min using a slot coating die, followed by drying and winding.

The double-sided coating layer after drying had a thickness of 6 μm on each side.

Example 2

A separator was manufactured in the same manner as in Example 1, except that 28 parts by weight of acrylamide, 28 parts by weight of acrylonitrile, 7 parts by weight of acrylic acid, and 7 parts by weight of 2-hydroxyethyl acrylate were used as the monomer mixture, wherein the manufactured binder particle had an average particle diameter of 115 nm in the form of latex, and the double-sided coating layer after drying had a thickness of 5.5 μm on each side.

Example 3

A separator was manufactured in the same manner as in Example 1, except that 21 parts by weight of acrylamide, 28 parts by weight of acrylonitrile, 10.5 parts by weight of acrylic acid, and 10.5 parts by weight of 2-hydroxyethyl acrylate were used as the monomer mixture, wherein the manufactured binder particle had an average particle diameter of 135 nm in the form of latex, and the double-sided coating layer after drying had a thickness of 6 μm on each side.

Example 4

A separator was manufactured in the same manner as in Example 1, except that 38.5 parts by weight of acrylamide, 24.5 parts by weight of acrylonitrile, 3.5 parts by weight of acrylic acid, and 3.5 parts by weight of 2-hydroxyethyl acrylate were used as the monomer mixture, wherein the manufactured binder particle had an average particle diameter of 125 nm in the form of latex, and the double-sided coating layer after drying had a thickness of 5 μm on each side.

Example 5

A separator was manufactured in the same manner as in Example 1, except that 21 parts by weight of acrylamide, 21 parts by weight of acrylonitrile, 14 parts by weight of acrylic acid, and 14 parts by weight of 2-hydroxyethyl acrylate were used as the monomer mixture, wherein the manufactured binder particle had an average particle diameter of 120 nm in the form of latex, and the double-sided coating layer after drying had a thickness of 6 μm on each side.

Example 6

A separator was manufactured in the same manner as in Example 1, except that 35 parts by weight of acrylamide, 24.5 parts by weight of acrylonitrile, 7 parts by weight of acrylic acid, and 3.5 parts by weight of 2-hydroxyethyl acrylate were used as the monomer mixture, wherein the manufactured binder particle had an average particle diameter of 130 nm in the form of latex, and the double-sided coating layer after drying had a thickness of 5.5 μm on each side.

Example 7

A separator was manufactured in the same manner as in Example 1, except that 35 parts by weight of acrylamide, 24.5 parts by weight of acrylonitrile, 3.5 parts by weight of acrylic acid, and 7 parts by weight of 2-hydroxyethyl acrylate were used as the monomer mixture, wherein the manufactured binder particle had an average particle diameter of 121 nm in the form of latex, and the double-sided coating layer after drying had a thickness of 5.5 μm on each side.

Example 8

A separator was manufactured in the same manner as in Example 1, except that 2 parts by weight of the binder particles were added and dispersed in 100 parts by weight of water, and then 98 parts by weight of boehmite (γ-AlO(OH)) (Apyral AOH60 manufactured by Nabaltec) having an average particle diameter of 500 nm was used, wherein the double-sided coating layer after drying had a thickness of 6 μm on each side.

Example 9

A separator was manufactured in the same manner as in Example 1, except that 5 parts by weight of the binder particles were added and dispersed in 100 parts by weight of water, and then 95 parts by weight of boehmite (γ-AlO(OH)) (Apyral AOH60 manufactured by Nabaltec) having an average particle diameter of 500 nm was used, wherein the double-sided coating layer after drying had a thickness of 5 μm on each side.

Example 10

A separator was manufactured in the same manner as in Example 1, except that 15 parts by weight of the binder particles were added and dispersed in 100 parts by weight of water, and then 85 parts by weight of boehmite (γ-AlO(OH)) (Apyral AOH60 manufactured by Nabaltec) having an average particle diameter of 500 nm was used, wherein the double-sided coating layer after drying had a thickness of 5.5 μm on each side.

Example 11

A separator was manufactured in the same manner as in Example 1, except that the binder particle latex was prepared to have an average particle diameter of 350 nm, wherein the double-sided coating layer after drying had a thickness of 5.5 μm on each side.

Comparative Example 1

A separator was manufactured in the same manner as in Example 1, except that 28 parts by weight of acrylamide, 35 parts by weight of acrylonitrile, and 7 parts by weight of acrylic acid were used as the monomer mixture, wherein the manufactured binder particle had an average particle diameter of 205 nm in the form of latex, and the double-sided coating layer after drying had a thickness of 5 μm on each side.

Comparative Example 2

A separator was manufactured in the same manner as in Example 1, except that 21 parts by weight of acrylamide, 42 parts by weight of acrylonitrile, and 7 parts by weight of acrylic acid were used as the monomer mixture, wherein the manufactured binder particle had an average particle diameter of 175 nm in the form of latex, and the double-sided coating layer after drying had a thickness of 5 μm on each side.

Comparative Example 3

A separator was manufactured in the same manner as in Example 1, except that 56 parts by weight of acrylamide, 7 parts by weight of acrylic acid, and 7 parts by weight of 2-hydroxyethyl acrylate were used as the monomer mixture, wherein the prepared copolymer was prepared in the form dispersed in ionized water, and the double-sided coating layer after drying had a thickness of 6 μm on each side.

Comparative Example 4

A separator was manufactured in the same manner as in Example 1, except that 56 parts by weight of acrylonitrile, 7 parts by weight of acrylic acid, and 7 parts by weight of 2-hydroxyethyl acrylate were used as the monomer mixture, wherein the manufactured binder particle had an average particle diameter of 120 nm in the form of latex, and the double-sided coating layer after drying had a thickness of 5.5 μm on each side.

Comparative Example 5

A slurry was 10 parts by weight of based on solid parts of polyvinylidene fluoride binder dissolved in dimethylsulfoxide (DMSO) (solid content: 30 wt %), and 90 parts by weight of boehmite (γ-AlO(OH)) (Apyral AOH60 manufactured by Nabaltec) having an average particle diameter of 500 nm were mixed and stirred to prepare a uniform slurry.

A polyolefin microporous membrane product (ENPASS manufactured by SK Innovation) having a thickness of 9 μm was used as the porous substrate, and the aqueous slurry was coated on both sides of the substrate at a speed of 10 m/min using a slot coating die. The double-sided coating layer after drying had a thickness of 5 μm on each side.

Comparative Example 6

A separator was manufactured in the same manner as in Example 1, except that 10 parts by weight of an acrylic latex (BM900B, solid content: 20 wt %) having a $T_g$ of −52° C. in 100 parts by weight of water and 90 parts by weight of boehmite (γ-AlO (OH)) (Apyral AOH60 manufactured by Nabaltec) having an average particle diameter of 500 nm were used, wherein the double-sided coating layer after drying had a thickness of 6 μm on each side.

Comparative Example 7

A separator was manufactured in the same manner as in Example 1, except that 15 parts by weight of an acrylic latex (BM900B, solid content: 20 wt %) having a $T_g$ of −52° C. in 100 parts by weight of water and 96 parts by weight of boehmite (γ-AlO (OH)) (Apyral AOH60 manufactured by Nabaltec) having an average particle diameter of 500 nm were used, wherein the double-sided coating layer after drying had a thickness of 5.5 μm on each side.

[Examples 12 to 22 and Comparative Examples 8 to 14] Manufacture of Lithium Secondary Battery (1) Manufacture of Cathode 94 wt % of $LiCoO_2$ as a cathode active material, 2.5 wt % of polyvinylidene fluoride as an adhesive, and 3.5 wt % of carbon black as a conductive agent were added to N-methyl-2-pyrrolidone (NMP) as a solvent, and stirred to prepare a uniform cathode slurry. The slurry was coated on an aluminum foil having a thickness of 30 μm, dried at 120° C., and pressed to manufacture a cathode electrode plate having a thickness of 150 μm.

(2) Manufacture of Anode 95 wt % of artificial graphite as an anode active material, 3 wt % of an acrylic latex (BM900B, solid content: 20 wt %) having a $T_g$ of −52° C. as an adhesive, 2 wt % of carboxymethyl cellulose (CMC) as a thickener were added to water as solvent, and stirred to form a uniform anode slurry. The slurry was coated on a copper foil having a thickness of 20 μm, dried at 120° C., and pressed to manufacture an anode electrode plate having a thickness of 150 μm.

(3) Manufacture of Battery

A pouch type battery was assembled by stacking the cathode, anode as manufactured above, and the separators manufactured in Examples 1 to 11 and Comparative Examples 1 to 7. An electrolyte in which ethylene carbonate (EC)/ethyl methyl carbonate (EMC)/dimethyl carbonate (DMC) having a volume ratio of 3:5:2 were dissolved in 1M of lithium hexafluorophosphate ($LiPF_6$), was injected into each of the assembled batteries to manufacture a lithium secondary battery.

Table 1 shows evaluation results of characteristics of the separator of Examples 1 to 11 and Comparative Examples 1 to 7, Table 2 shows evaluation results of lithium secondary batteries of Examples 12 to 22 and Comparative Examples 8 to 14, and Table 3 shows results obtained by measuring the capacity retention rate according to the C-rate of the lithium secondary batteries of Examples 12 to 22 and Comparative Examples 8 to 14. In Table 3, the unit of the capacity retention rate is mAh/g, which represents a capacity relative to a mass of the cathode active material.

TABLE 1

| Classification | Thermal shrinkage ratio at 160° C. (MD/TD, %) | TMA melt fracture temperature (° C.) | Glass transition temperature (° C.) | Tensile strength (Kgf) | Average particle ratio |
|---|---|---|---|---|---|
| Example 1 | 1.0/1.2 | 232 | 179 | 1.2 | 0.22 |
| Example 2 | 1.0/1.0 | 233 | 178 | 1.2 | 0.23 |
| Example 3 | 1.5/1.5 | 221 | 172 | 1.3 | 0.27 |
| Example 4 | 1.6/1.8 | 213 | 170 | 1.0 | 0.25 |
| Example 5 | 1.6/1.7 | 220 | 171 | 0.6 | 0.24 |
| Example 6 | 1.2/1.3 | 229 | 176 | 1.4 | 0.26 |
| Example 7 | 1.0/1.2 | 231 | 178 | 1.4 | 0.24 |
| Example 8 | 1.3/1.4 | 222 | 178 | 0.8 | 0.22 |
| Example 9 | 1.2/1.3 | 228 | 179 | 1.0 | 0.22 |
| Example 10 | 0.8/0.9 | 241 | 186 | 1.5 | 0.22 |
| Example 11 | 1.8/1.9 | 205 | 175 | 1.0 | 0.70 |
| Comparative Example 1 | 12.5/12.7 | 168 | 24 | 1.0 | 0.41 |

TABLE 1-continued

| Classification | Thermal shrinkage ratio at 160° C. (MD/TD, %) | TMA melt fracture temperature (° C.) | Glass transition temperature (° C.) | Tensile strength (Kgf) | Average particle ratio |
|---|---|---|---|---|---|
| Comparative Example 2 | 9.9/10.2 | 172 | 51 | 1.0 | 0.35 |
| Comparative Example 3 | 38/39 | 170 | 145 | 0.5 | — |
| Comparative Example 4 | 8.8/9.0 | 169 | 146 | 0.7 | 0.24 |
| Comparative Example 5 | 38/42 | 167 | −35 | 1.1 | — |
| Comparative Example 6 | 45/48 | 179 | −52 | 1.0 | — |
| Comparative Example 7 | 51/56 | 181 | −53 | 1.0 | — |

As shown in Table 1, it could be confirmed that in the separators of Examples in which coating layers including the inorganic particles and the binder particles that was prepared with a copolymer of a monomer mixture including the acrylamide-based monomer, the vinyl cyanide monomer, the acrylic monomer having a carboxyl group, and the acrylic monomer having a hydroxyl group, were formed on both sides of the porous substrate, the thermal shrinkage at 160° C. was lower, and the TMA melt fracture temperature was significantly increased, and thus the thermal stability of the separator was remarkably improved as compared with Comparative Examples.

Meanwhile, it was confirmed that in comparison between Examples 1 and 11, when the binder particles and the inorganic particles had the average particle diameter ratio satisfying Equation 1 above, thermal properties were further increased, and thus the thermal stability could be more improved.

In addition, it was confirmed that in comparison between Examples 1-3 and 5-7 with Example 4, when the binder particles included 30 to 50 wt % of the acrylamide-based monomer, 20 to 40 wt % of the vinyl cyanide monomer, 5 to 20 wt % of the acrylic monomer having a carboxyl group, and 5 to 20 wt % of the acrylic monomer having a hydroxyl group, more improved thermal stability and separator strength could be exhibited.

Further, it was confirmed that in comparison between Examples 1, 2, 6, and 7 with Examples 3 and 5, the binder particles included 40 to 50 wt % of the acrylamide-based monomer, 30 to 40 wt % of the vinyl cyanide monomer, 5 to 15 wt % of the acrylic monomer having a carboxylic group, and 5 to 15 wt % of the acrylic monomer having a hydroxyl group, excellent thermal stability was exhibited.

It was also confirmed that when the binder in the form dispersed in the aqueous slurry was prepared as in Comparative Example 3, the thermal stability was lowered.

In addition, it could be confirmed that when polyvinylidene fluoride of Comparative Example 5 and the acrylic polymer having a significantly low glass transition temperature of Comparative Examples 6 and 7, which were conventionally used, were used as the coating layer, the thermal shrinkage ratio at 160° C. was higher and the TMA melt fracture temperature was lower than those of Examples. In addition, it was confirmed that the thermal stability was low, such that when shut down or melt down of the porous substrate occurred at a high temperature, it was difficult to prevent a short-circuit between the electrodes, resulting in a decrease in battery stability.

TABLE 2

| Classification | Discharge resistance (Ω) | Battery lifespan discharge capacity ratio relative to initial capacity (%) | Change in battery thickness (%) | Battery penetration stability |
|---|---|---|---|---|
| Example 12 | 1.83 | 85.6 | 1.5 | L3(pass) |
| Example 13 | 1.82 | 85.8 | 1.5 | L3(pass) |
| Example 14 | 1.90 | 81.8 | 1.7 | L3(pass) |
| Example 15 | 1.94 | 78.8 | 1.9 | L5(fail) |
| Example 16 | 1.92 | 81.0 | 1.7 | L3(pass) |
| Example 17 | 1.88 | 82.9 | 1.5 | L3(pass) |
| Example 18 | 1.82 | 85.1 | 1.5 | L3(pass) |
| Example 19 | 1.78 | 83.9 | 1.6 | L3(pass) |
| Example 20 | 1.80 | 84.2 | 1.6 | L3(pass) |
| Example 21 | 1.88 | 84.5 | 1.5 | L3(pass) |
| Example 22 | 1.96 | 80.1 | 1.9 | L5(fail) |
| Comparative Example 8 | 2.08 | 66.1 | 4.8 | L3(pass) |
| Comparative Example 9 | 2.04 | 67.2 | 3.0 | L3(pass) |
| Comparative Example 10 | 2.13 | 60.8 | 5.1 | L5(fail) |
| Comparative Example 11 | 2.04 | 67.0 | 2.5 | L5(fail) |
| Comparative Example 12 | 2.19 | 57.7 | 6.6 | L5(fail) |
| Comparative Example 13 | 1.98 | 57.1 | 6.3 | L5(fail) |
| Comparative Example 14 | 2.24 | 55.2 | 6.8 | L5(fail) |

As shown in Table 2, it was confirmed that the lithium secondary batteries including the separators of Examples in which the coating layers including the inorganic particles and the binder particles that were prepared with a copolymer of a monomer mixture including the acrylamide-based monomer, the vinyl cyanide monomer, the acrylic monomer having a carboxyl group, and the acrylic monomer having a hydroxyl group, were formed on both sides of the porous substrate, had a low discharge resistance, and remarkably improved thermal stability to prevent a short-circuit between the electrodes despite battery penetration, and thus the battery stability such as the battery lifespan discharge capacity ratio relative to initial capacity, the change in battery thickness, the battery penetration stability, or the like, remarkably increased.

Meanwhile, it was confirmed that when the binder particle and the inorganic particle had the average particle diameter ratio satisfying the above-described Equation 1, in comparison between Example 12 and Example 22, excellent thermal resistance, the battery lifespan discharge capacity ratio relative to initial capacity, the change in battery thickness, the battery penetration stability, and the like, were more enhanced, and thus the battery stability could be further improved.

In addition, it was confirmed that in comparison between Examples 12-14 and 16-18 with Example 15, when the binder particles included 30 to 50 wt % of the acrylamide-based monomer, 20 to 40 wt % of the vinyl cyanide monomer, 5 to 20 wt % of the acrylic monomer having a carboxyl group, and 5 to 20 wt % of the acrylic monomer having a hydroxyl group, more improved thermal stability and separator strength could be exhibited, and thus the battery life improvement effect and stability were further improved.

Further, it was confirmed that in comparison between Examples 12, 13, 17, and 18 with Examples 14 and 16, the binder particles included 40 to 50 wt % of the acrylamide-based monomer, 30 to 40 wt % of the vinyl cyanide monomer, 5 to 15 wt % of the acrylic monomer having a carboxylic group, and 5 to 15 wt % of the acrylic monomer having a hydroxyl group, the battery life improvement effect and stability were excellent.

Further, when including the coating layer in which the binder in the particle phase was not included in the aqueous slurry as in Comparative Example 10, the binder penetrated into the pores of the porous substrate, which caused pore closure, such that movement of lithium ions was limited, and ignition, explosion, or the like due to overheating and overloading occurred.

In addition, it could be appreciated from Examples 19 to 21 that when the binder particle of the present disclosure was included, the increase rate of the discharge resistance was low even when the content of the binder particle increased, such that a rapid decrease in the initial lifespan could be prevented to implement excellent battery characteristics for a long period of time.

Further, it could be confirmed that when the polyvinylidene fluoride of Comparative Example 12 and the acrylic polymer having a significantly low glass transition temperature of Comparative Examples 13 and 14, which were conventionally used, were used as the coating layer, the thermal stability was low, such that when shut down or melt down of the porous substrate occurred at a high temperature, it was difficult to prevent a short-circuit between the electrodes, resulting in decrease in battery stability.

TABLE 3

| | Discharge current | | | |
| --- | --- | --- | --- | --- |
| | 0.5C | 1.0C | 2.0C | 3.0C |
| Example 12 | 100 | 99 | 83 | 60 |
| Example 13 | 100 | 99 | 83 | 61 |
| Example 14 | 100 | 99 | 84 | 63 |
| Example 15 | 100 | 98 | 76 | 51 |
| Example 16 | 100 | 98 | 79 | 53 |
| Example 17 | 100 | 98 | 83 | 60 |
| Example 18 | 100 | 98 | 83 | 60 |
| Example 19 | 100 | 98 | 83 | 58 |
| Example 20 | 100 | 98 | 83 | 60 |
| Example 21 | 100 | 99 | 84 | 63 |
| Example 22 | 100 | 96 | 78 | 55 |
| Comparative Example 8 | 100 | 94 | 71 | 48 |
| Comparative Example 9 | 100 | 90 | 72 | 48 |
| Comparative Example 10 | 100 | 95 | 69 | 40 |
| Comparative Example 11 | 100 | 97 | 71 | 42 |
| Comparative Example 12 | 100 | 97 | 72 | 40 |
| Comparative Example 13 | 100 | 94 | 61 | 35 |
| Comparative Example 14 | 100 | 91 | 69 | 39 |

As shown in Table 3, it could be confirmed that in the lithium secondary batteries including the separators of the Examples in which the coating layers including the inorganic particles and the binder particles that were prepared with the copolymer of the monomer mixture including the acrylamide-based monomer, the vinyl cyanide monomer, the acrylic monomer having a carboxyl group, and the acrylic monomer having a hydroxyl group, were formed on both sides of the porous substrate, the capacity retention ratio according to C-rate could be remarkably improved.

It could be confirmed that when the binder particles and the inorganic particles had the average particle diameter ratio satisfying the above-described Equation 1, in comparison between Example 12 and Example 22, the capacity retention ratio according to C-rate could be further improved.

In addition, it was confirmed that in comparison between Examples 12-14 and 16-18 with Example 15, when the binder particles included 30 to 50 wt % of the acrylamide-based monomer, 20 to 40 wt % of the vinyl cyanide monomer, 5 to 20 wt % of the acrylic monomer having a carboxyl group, and 5 to 20 wt % of the acrylic monomer having a hydroxyl group, more improved thermal stability and separator strength could be exhibited, and thus the capacity retention ratio according to C-rate could be further improved.

Further, it was confirmed that in comparison between Examples 12, 13, 17, and 18 with Examples 14 and 16, the binder particles included 40 to 50 wt % of the acrylamide-based monomer, 30 to 40 wt % of the vinyl cyanide monomer, 5 to 15 wt % of the acrylic monomer having a carboxylic group, and 5 to 15 wt % of the acrylic monomer having a hydroxyl group, the capacity retention ratio according to a C-rate was excellent.

In addition, it could be confirmed that when polyvinylidene fluoride of Comparative Example 12 and the acrylic polymer having a significantly low glass transition temperature of Comparative Examples 13 and 14, which were conventionally used, were used as the coating layer, the capacity retention rate of the battery was rapidly poorer than those of the Examples.

Therefore, the separator for a secondary battery of the present disclosure may have not only excellent thermal stability and battery stability, but also excellent electrical properties such as capacity retention rate, and the like, and thus remarkably superior characteristics may be exhibited when the separator is applied to a lithium secondary battery.

The separator for a secondary battery according to an embodiment of the present disclosure may have significantly improved thermal stability such as a low thermal shrinkage ratio, a high melt fracture temperature, or the like, to prevent ignition or rupture caused by abnormal phenomenon such as a rapid increase in temperature, or the like.

In addition, the separator for a secondary battery according to an embodiment of the present disclosure may improve a rapid decrease in the initial lifespan of a secondary battery, secure additional stability, and ensure coating processability since an increase rate of resistance in a cell is low even when a content of a binder increases.

In addition, the separator for a secondary battery according to an embodiment of the present disclosure may be introduced to improve performance such as thermal stability and electrical characteristics of a large lithium secondary battery applied to an electric vehicle, or the like.

Hereinabove, the separator for a secondary battery, the method for manufacturing the same, and the lithium secondary battery containing the same have been described in the present disclosure through specific matters and limited exemplary embodiments, but they are provided only for assisting in the entire understanding of the present disclosure. Therefore, the present disclosure is not limited to the exemplary embodiments and various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scopes and spirits of the disclosure.

What is claimed is:

1. A separator for a secondary battery comprising:
   a porous substrate; and a coating layer formed on the porous substrate,
   wherein the coating layer includes a plurality of inorganic particles and a binder for binding the plurality of inorganic particles, and
   wherein the binder includes a copolymer of a monomer mixture including 30 to 50 wt % of an acrylamide-based monomer, 20 to 40 wt % of a vinyl cyanide monomer, 5 to 20 wt % of an acrylic monomer having a carboxyl group, and 5 to 20 wt % of an acrylic monomer having a hydroxyl group, based on a total amount of the copolymer.

2. The separator for a secondary battery of claim 1, wherein the coating layer includes 70 to 99.5 wt % of inorganic particles and 0.5 to 30 wt % of a binder, based on a total amount of the coating layer.

3. The separator for a secondary battery of claim 1, wherein the binder has a particle phase.

4. The separator for a secondary battery of claim 3, wherein the inorganic particle and the binder particle have an average particle diameter of 10 nm to 2 μm.

5. The separator for a secondary battery of claim 1, wherein the binder has a glass transition temperature of 150 to 200° C.

6. The separator for a secondary battery of claim 1, wherein the copolymer has a weight average molecular weight of 100,000 to 1,000,000 g/mol.

7. A method for manufacturing a separator for a secondary battery, comprising:
   a) applying an aqueous slurry including inorganic particles, a binder, and water on a porous substrate; and
   b) forming a coating layer by heat drying after applying the aqueous slurry,
   wherein the binder includes a copolymer of a monomer mixture including 30 to 50 wt % of an acrylamide-based monomer, 20 to 40 wt % of a vinyl cyanide monomer, 5 to 20 wt % of an acrylic monomer having a carboxyl group, and 5 to 20 wt % of an acrylic monomer having a hydroxyl group, based on a total amount of the copolymer.

8. The method of claim 7, wherein a drying temperature in step b) ranges from 60 to 100° C.

9. A lithium secondary battery comprising the separator for a secondary battery of claim 1.

* * * * *